(12) United States Patent
Alexander

(10) Patent No.: US 12,055,768 B2
(45) Date of Patent: Aug. 6, 2024

(54) STRAIN RELIEF BOOT

(71) Applicant: COMMSCOPE TECHNOLOGIES LLC, Hickory, NC (US)

(72) Inventor: Brian L. Alexander, Edina, MN (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 179 days.

(21) Appl. No.: 17/618,229

(22) PCT Filed: Jun. 10, 2020

(86) PCT No.: PCT/US2020/037031
§ 371 (c)(1),
(2) Date: Dec. 10, 2021

(87) PCT Pub. No.: WO2020/252048
PCT Pub. Date: Dec. 17, 2020

(65) Prior Publication Data
US 2022/0221661 A1     Jul. 14, 2022

Related U.S. Application Data

(60) Provisional application No. 62/859,406, filed on Jun. 10, 2019.

(51) Int. Cl.
*G02B 6/38*         (2006.01)
(52) U.S. Cl.
CPC ................. *G02B 6/38875* (2021.05)
(58) Field of Classification Search
CPC ................................................. G02B 6/38875
See application file for complete search history.

(56) References Cited

U.S. PATENT DOCUMENTS

| | | |
|---|---|---|
| 5,261,019 A | 11/1993 | Beard et al. |
| 5,390,272 A | 2/1995 | Repta et al. |
| 5,915,056 A | 6/1999 | Bradley et al. |
| 7,147,385 B2 | 12/2006 | Zimmel et al. |
| 7,563,033 B2 | 7/2009 | Adomeit et al. |
| 7,677,812 B2 | 3/2010 | Castagna et al. |
| 7,942,591 B2 | 5/2011 | Hopkins et al. |
| 8,342,755 B2 | 1/2013 | Nhep |
| 8,434,218 B2 | 5/2013 | Nelson et al. |

(Continued)

FOREIGN PATENT DOCUMENTS

| | | |
|---|---|---|
| JP | 2018-092024 A | 6/2018 |
| WO | 2016/115288 A1 | 7/2016 |
| WO | 2017/142748 A1 | 8/2017 |

OTHER PUBLICATIONS

International Search Report and Written Opinion of the International Searching Authority for International Patent Application No. PCT/US2020/037031 mailed Oct. 8, 2020, 11 pages.

*Primary Examiner* — Sung H Pak
(74) *Attorney, Agent, or Firm* — MERCHANT & GOULD P.C.

(57) ABSTRACT

A strain relief boot and fiber optic connectors and modules having strain relief boots are provided. The strain relief boots of the present disclosure are flexible enough to bend when small side loads are applied to the boot and stiff enough to resist bending when large side loads are applied to the boot. In one embodiment, the strain relief boot is constructed of multiple different materials each having different stiffness properties.

24 Claims, 6 Drawing Sheets

(56) References Cited

U.S. PATENT DOCUMENTS

| | | |
|---|---|---|
| 8,646,989 B2 | 2/2014 | Zimmel et al. |
| 8,702,323 B2 | 4/2014 | Nhep |
| 9,551,842 B2 | 1/2017 | Theuerkorn |
| 9,857,540 B2 * | 1/2018 | Ahmed ................ G02B 6/3893 |
| 9,989,711 B2 | 6/2018 | Ott et al. |
| 10,481,347 B2 | 11/2019 | Kachmar |
| 10,770,831 B2 * | 9/2020 | Kralik .................... H01R 43/26 |
| 2015/0153516 A1 | 6/2015 | Lin |
| 2016/0261937 A1 | 9/2016 | Kowalczyk et al. |
| 2017/0371108 A1 | 12/2017 | Richmond et al. |

* cited by examiner

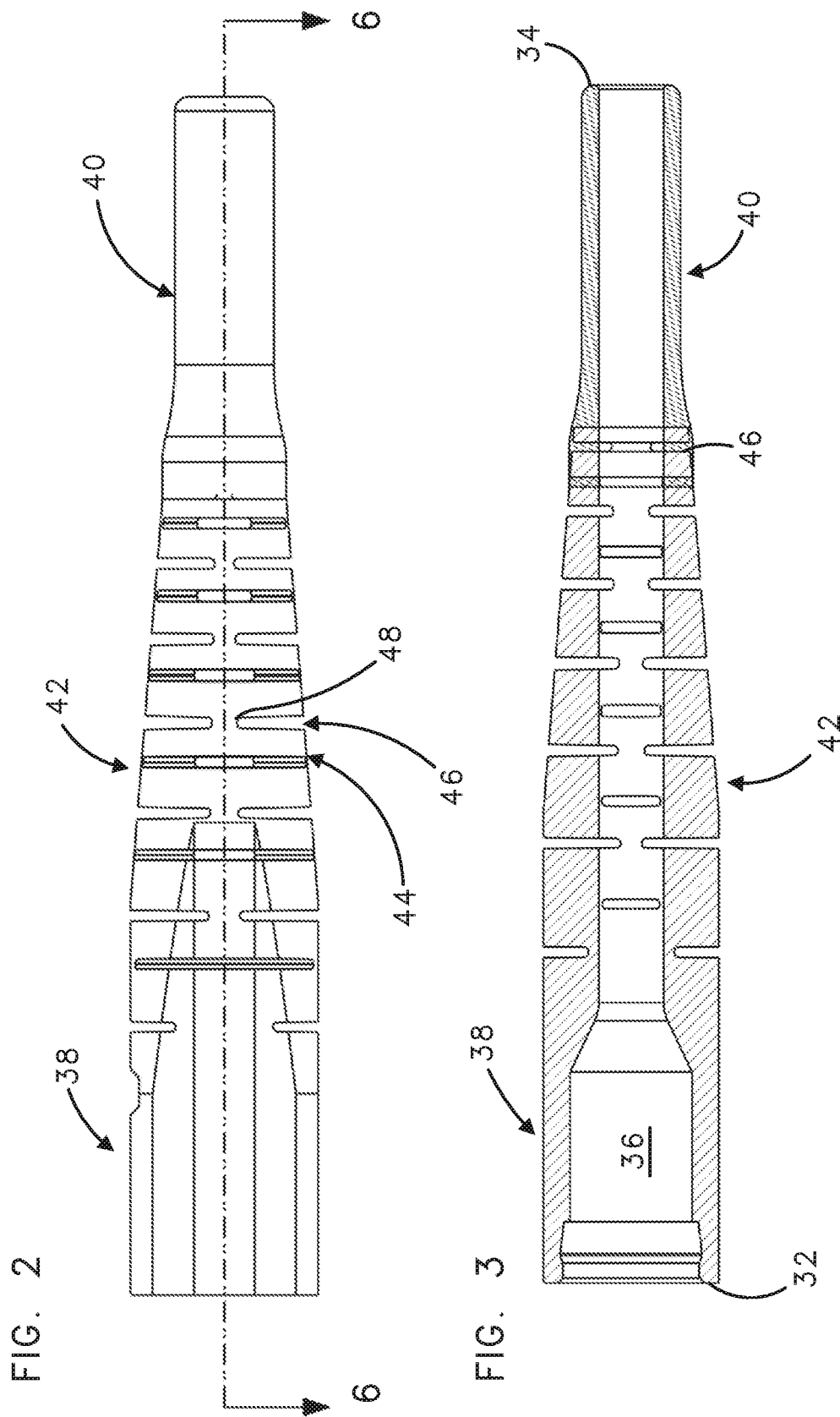

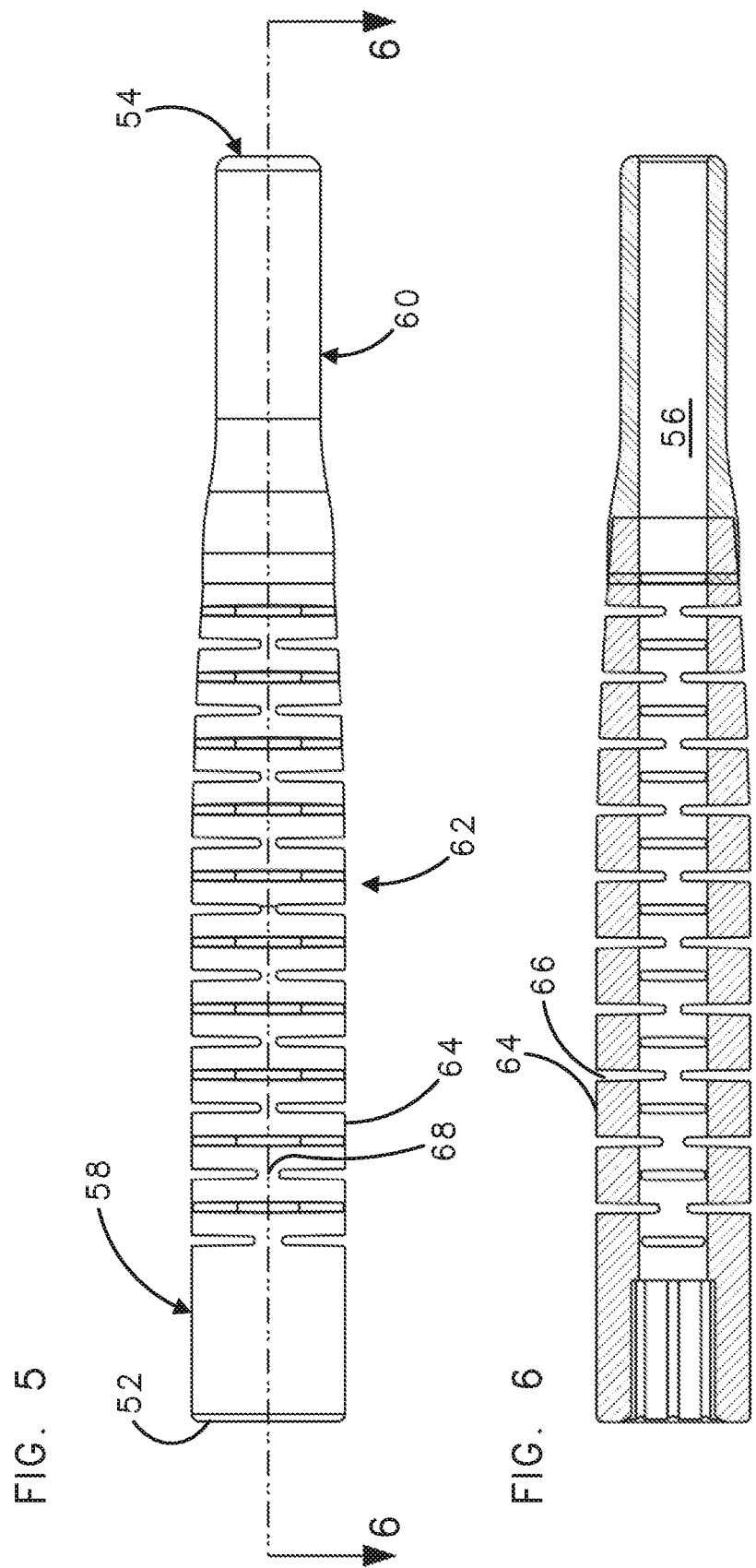

STRAIN RELIEF BOOT

CROSS-REFERENCE TO RELATED APPLICATION

This application is a National Stage Application of PCT/US2020/037031, filed on Jun. 10, 2020, which claims the benefit of U.S. Patent Application Ser. No. 62/859,406, filed on Jun. 10, 2019, the disclosures of which are incorporated herein by reference in their entireties. To the extent appropriate, a claim of priority is made to each of the above disclosed applications.

FIELD OF THE INVENTION

The present invention relates to terminating the ends of fiber optic cables in fiber optic connectors and modules. More particularly, the present disclosure relates to strain relief boots.

BACKGROUND OF THE INVENTION

Fiber optic communication systems are becoming prevalent as service providers deliver high bandwidth communication capabilities (e.g., data and voice) to customers. Fiber optic communication systems employ a network of fiber optic cables to transmit large volumes of data and voice signals over relatively long distances.

Optical fiber connectors are an important part of most fiber optic communication systems. Fiber optic connectors allow two optical fibers to be optically connected quickly without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a distal end of a connector housing. The ferrule functions to support an end portion of at least one optical fiber (in the case of a multi-fiber ferrule, the ends of multiple fibers are supported). When two fiber optic connectors are interconnected, the distal end faces of the ferrules abut one another thereby aligning the end faces of the optical fibers directly opposed to one another. Optical signals can be transmitted from optical fiber to optical fiber through the aligned end faces of the optical fibers.

Fiber optic connectors often include strain relief boots mounted at proximal ends of the connector housings. Strain relief boots are designed to prevent the optical fibers within the fiber optic cables secured to the fiber optic connectors from bending to radii less than the minimum bend radii of the optical fibers when side loads are applied to the fiber optic cables. Example strain relief boot configurations are disclosed in U.S. Pat. Nos. 8,702,323; 8,342,755; 7,942,591; 7,677,812; 7,147,385; 5,915,056; 5,390,272; and 5,261,019. Some strain relief boots are designed to prevent the optical fiber cable from bending sharper than its minimum bend radius when a large side load is applied to the cable. Other strain relief boots are designed to prevent the optical fiber cables from bending sharper than its minimum bend radius when small side loads are applied to the boot. There is a need for strain relief boots that bend under small side loads to protect the optical fiber and also resist bending under large side loads to protect the optical fiber.

A number of factors are important with respect to the design of a fiber optic connector. One such factor relates to connector size and the ability to provide enhanced connector/circuit densities. Another factor relates to the ability to provide high signal quality connections with minimal signal degradation.

SUMMARY

The present disclosure provides a strain relief boots and fiber optic connectors and modules that include strain relief boots. The strain relief boots of the present disclosure are flexible enough to bend when small side loads are applied thereto and stiff enough to resist bending when large side loads are applied thereto. The strain relief boots of the present disclosure are capable of protecting a cable within the boot from bending sharper than its minimum bend radius when exposed to both low side load forces and high side load forces. In one embodiment, the strain relief boots of the present disclosure are constructed of multiple different materials each having different stiffness properties. In one embodiment, the strain relief boots are manufactured from a multiple-shot/multiple-material injection molding process. A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 2 is a top view of the boot of FIG. 1;

FIG. 3 is a cross-sectional view of the boot of FIG. 1;

FIG. 5 is a top view of the boot of FIG. 4;

FIG. 6 is a cross-sectional view of the boot of FIG. 4;

DETAILED DESCRIPTION

Strain relief boots function to prevent the optical fiber cable from bending sharper than a predetermined minimum bend radius for the particular optical fiber cable. The minimum bend radii for optical fiber cables varies depending on the particular construction of the optical fiber cable and its application. For one commonly used optical fiber, the minimum bend radius is 30 mm at 100 turns. For another commonly used optical fiber, the minimum bend radius is 5 mm at 1 turn. The minimum bend radius of an optical cable is a known predetermined number that is determined via testing done by the optical cable manufacturer.

Typically, strain relief boots are optimized to protect the optical fiber either when large side loads are applied to the cable or when small side loads are applied to the cable, not both. Strain relief boots that are reactive to low side loads tend to collapse and fold over on themselves when large side loads are applied. Conversely, strain relief boots that are stiff enough to resist bending under large side loads tend not to react (bend) when small side loads are applied. The space constraints for strain relief boots makes it particularly challenging to construct strain relief boots that are both flexible enough to bend to protect the cable under small side loads and also stiff enough to resist bending to protect the cable under large side loads. Given the application and the density of optical fiber connectors in a field application, there are practical limitations to the length of the strain relief boots as well as their maximum diameter.

The present disclosure provides strain relief boots that bend under small side loads to protect the optical fiber while at the same time resist bending under large side loads. The strain relief boot of the present disclosure protects the optical fiber in all conditions. In one embodiment, the boot of the present disclosure bends under as little as 0.2 lbs-force side load and resists bending beyond a predetermined bend radius under a side load of as great as 7.5 lbs-force.

The strain relief boots of the present disclosure have application anywhere in an optical system where the bending of the fiber sharper than its minimum bend radius is possible. One common application of the boot of the present disclosure is at a proximal end of a telecommunication connector. Another common application of the boot is at the exit/entry of a telecommunication module.

Figure 1:
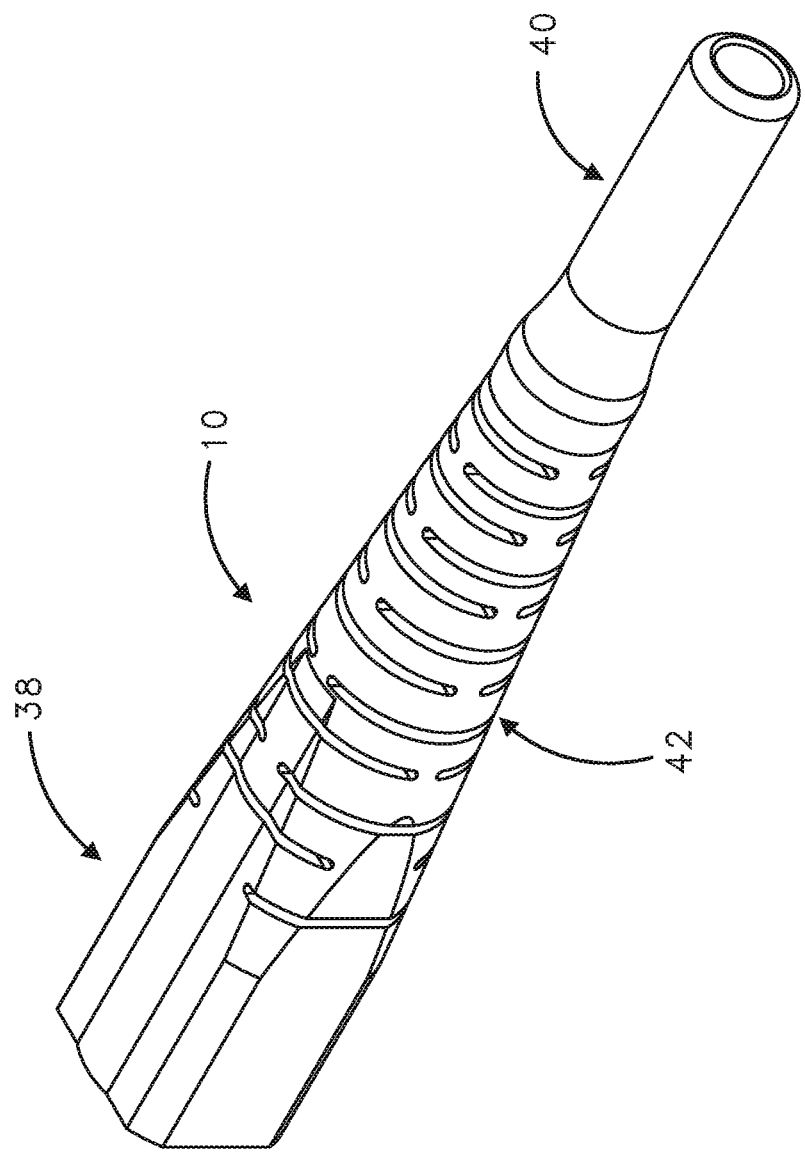
FIG. 1 is an isometric view of a boot according to an embodiment of the present disclosure.
Figure 7:
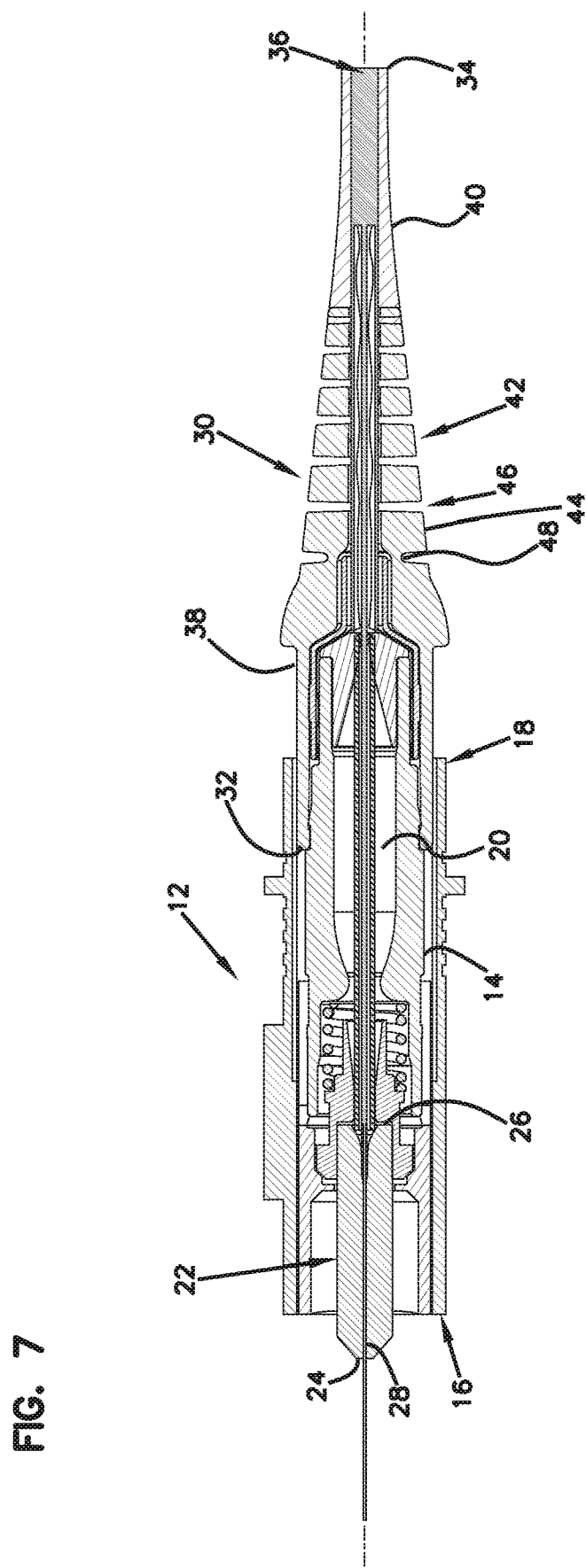
FIG. 7 is a cross-sectional view of a fiber optic connector according to the principles of the present disclosure.

Referring to the FIGS., the present disclosure is described in further detail. Referring to FIGS. 1-3, a strain relief boot 10 of an SC type connector according to the principles of the present disclosure is shown. FIG. 7 depicts the strain relief boot 10 as part of an SC type connector 12.

Referring to FIGS. 1-3 and 7, an embodiment of the fiber optic connector 12 according to the principles of the present disclosure is described. In the depicted embodiment, the fiber optic connector 12 includes a connector housing 14. The connector housing 14 includes a first end 16 and a second end 18. The connector housing 14 includes a connector housing axial passage 20 that extends from the first end 16 of the connector housing 14 to the second end 18 of the connector housing 14. It should be appreciated that other housing configurations are also possible.

In the depicted embodiment, the fiber optic connector 12 includes a ferrule 22. The ferrule 22 has a first end 24 and a second end 26. The second end 26 of the ferrule 22 is secured to the first end 16 of the connector housing 14. The ferrule 22 includes a ferrule axial passage 28 that extends from the first end 24 of the ferrule 22 to the second end 26 of the ferrule 22. In the depicted embodiment, the ferrule axial passage 28 is coaxially arranged with the connector housing axial passage 20. In the depicted embodiment, the ferrule 22 is spring loaded so that it can move axially. In other embodiments, the ferrule 22 could be fixed axially. It should be appreciated that many other ferrule configurations are also possible.

In the depicted embodiment, the fiber optic connector 12 includes a boot 30. The boot 30 is similar to the boot 10 and hence are described herein simultaneously with like reference numerals. The boot 30 includes a first end 32 and a second end 34. The boot 30 has a boot axial passage 36 that extends from the first end 32 of the boot 30 to the second end 34 of the boot 30. In the depicted embodiment, the boot axial passage 36 is coaxially arranged with the connector housing axial passage 20. In the depicted embodiment, the boot axial passage 36 is sufficiently large to slidably receive a fiber optic cable.

In the depicted embodiment, the boot 30 includes a boot first end portion 38 adjacent the first end 32 of the boot 30. The boot first end portion 38 is connected to the second end 18 of the connector housing 14. In the depicted embodiment, the boot first end portion 38 is stretched and placed over a portion of the second end 18 of the connector housing 14. The boot first end portion 38 is adapted to retain the connector housing 14 once it has been stretched and placed over the connector housing 14. In the depicted example, the first end portion 38 includes retention features which are snap-on features. The snap-on features attach over a portion of the connector housing 14 in order for the boot 30 to retain the connector housing 14 and the connector 12. The first end portion 38 can also include other retention features (e.g., threads). In the depicted embodiment, the boot 30 includes a boot second end portion 40 adjacent the second end 34 of the boot 30. The boot 30 also includes a boot middle portion 42.

In the depicted embodiment, the boot middle portion 42 is constructed of a first material and the boot second end portion 40 is constructed of a second material. In the depicted embodiment, the second material is different than the first material. In the depicted embodiment, the first end portion 38 is constructed from the first material. In the depicted embodiment, the boot middle portion 42 is constructed unitarily with the first end portion 38. In the depicted embodiment, the second material is softer than the first material. In the depicted embodiment, the first material is a polybutylene terephthalate material and the second material is a thermoplastic vulcanizate material. In the depicted embodiment, the second material is Santoprene. It should be appreciated that many alternative embodiments are possible. For example, the first material could be softer than the second material. It should also be appreciated that any or all of the first end portion 38, boot middle portion 42, and the boot second end portion 40 could be constructed of a composite blend of materials. Each of the first or the second material could be a composite of materials. In addition, each of the first end portion 38, boot middle portion 42 and the boot second end portion 40 could be constructed in subparts having different materials in each of the subparts. It should be appreciated that many alternatives are possible.

In the depicted embodiment, the boot middle portion 42 utilizes geometry to provide progressive flex. In particular, the boot middle portion 42 includes a plurality of co-axial rings 44 separated by axial gaps 46. The rings 44 are interconnected by links 48 that extend across the axial gaps 46. The overall profile of the boot middle portion 42 tapers towards the first end 32 to the second end 34 of the boot. In the depicted embodiment, the boot first end portion 38, and second end portion 40 include a continuous smooth exterior surface profile.

In the depicted embodiment, the boot second end portion 40 is molded to the boot middle portion 42. In the depicted embodiment, the boot second end portion 40 is molded over a proximal end portion of the boot middle portion 42. In the depicted embodiment, the second material used to construct the second end portion 40 is molded to at least partially fill an axial gap 46 of the boot middle portion 42. The second material is anchored to the first material.

In the depicted embodiment, the boot 30 is between 37 to 47 millimeters long. In the depicted embodiment, the boot 30 is between 40 and 44 millimeters long. In the depicted embodiment, the second end portion 40 is between 10 to 18 millimeters long. In the depicted embodiment, the second end portion 40 is between 12 and 16 millimeter long. In the depicted embodiment, the axial passage 36 is between 2 to 2.5 millimeters in diameter. The outer diameter of the second end portion 40 is between 3 to 4 millimeters in diameter. In the depicted embodiment, the portion of the second end portion 40 that is molded over a portion of the middle portion 42 is between 1 to 4 millimeters long.

Figure 4:
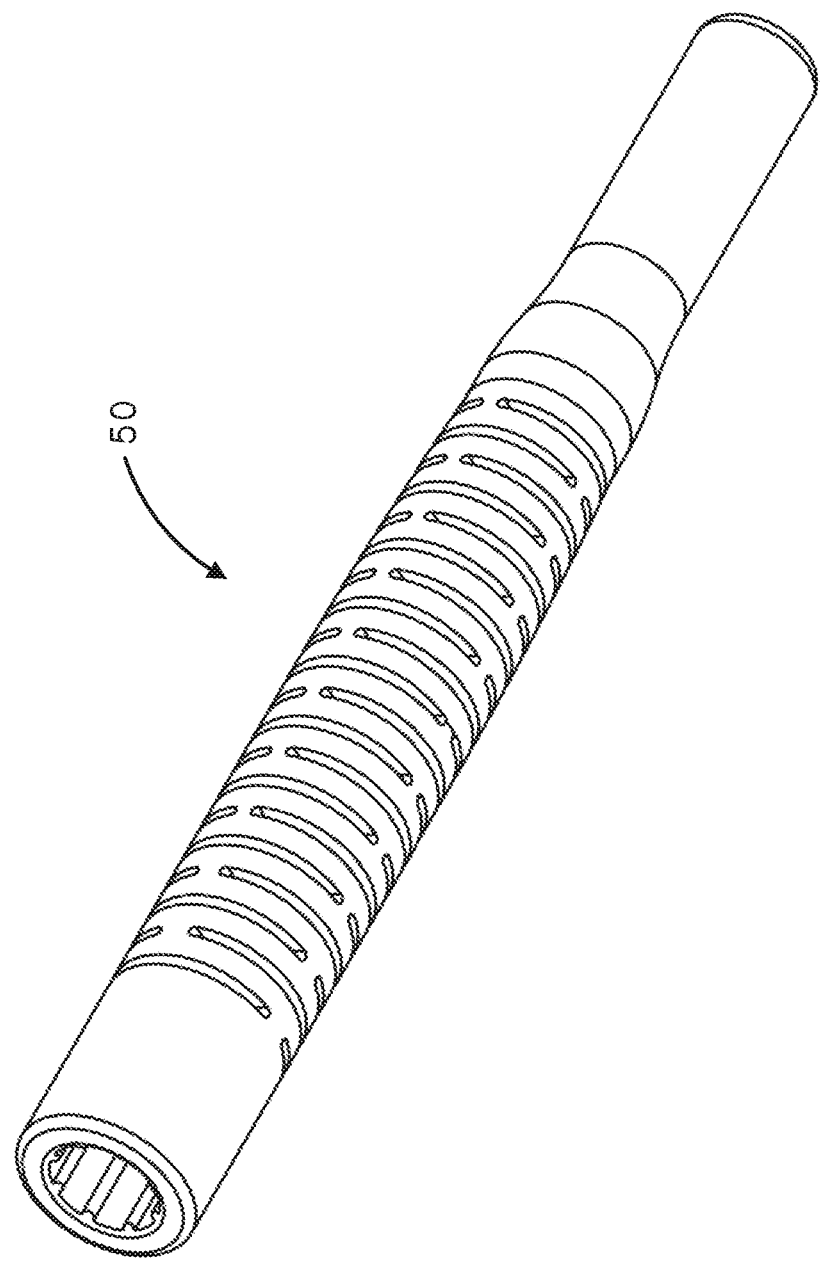
FIG. 4 is an isometric view of an alternative embodiment of a boot according to the present disclosure.

Referring to FIGS. 4-6, an alternative embodiment of a boot according to the present disclosure is described. The boot 50 has similar features of the boot 10. The boot 50 includes a first end 52 and a second end 54. The boot 50 has a boot axial passage 56 that extends from the first end 52 of the boot to the second end 54 of the boot. The boot 50 includes a boot first end portion 58 adjacent the first end 52 of the boot configured to mount to a telecommunication housing. The boot 50 includes a second end portion 60 adjacent the second end 54 of the boot 50. The boot 50 includes a boot middle portion 62. The boot middle portion 62 is constructed of a first material and the boot second end portion 60 is constructed of a second material. In the depicted embodiment, the first end portion 58 is also constructed of the first material. In the depicted embodiment, the second material is different than the first material. In the depicted embodiment, the first material is a reinforced thermoplastic material and the second material is a softer more flexible material. As discussed above, many alternative materials could be used in many different combinations.

In the depicted embodiment, the boot middle portion 62 includes a plurality of co-axial rings 64 separated by axial gaps 66. The rings 64 are interconnected by links 68 that extend across the axial gaps 66. In the depicted embodiment, the boot second end portion 60 is molded over a portion of the boot middle portion 62. In the depicted embodiment, the second material molded at least partially fills an axial gap 66 of the boot middle portion 62. This construction results in an interlocking configuration that further anchors the boot second end portion 60 to the boot middle portion 62. In the depicted embodiment, the boot first end portion 58, and second end portion 60 include a continuous smooth exterior surface profile.

In the depicted embodiment, the boot 50 is between 37 to 47 millimeters long. In the depicted embodiment, the boot 50 is between 40 and 44 millimeters long. In the depicted embodiment, the second end portion 60 is between 10 to 18 millimeters long. In the depicted embodiment, the second end portion 60 is between 12 and 16 millimeters long. In the depicted embodiment, the axial passage 56 is between 2 to 3 millimeters in diameter. The outer diameter of the second end portion 60 is between 3 to 4 millimeters in diameter. In the depicted embodiment, the portion of the second end portion 60 that is molded over a portion of the middle portion 62 is between 1 to 4 millimeters long. It should be appreciated that many other configurations are possible. In the depicted embodiment, the boot of the present disclosure has a broad range of capabilities yet takes up essentially no more space than boots that lack such capabilities.

Figure 8:
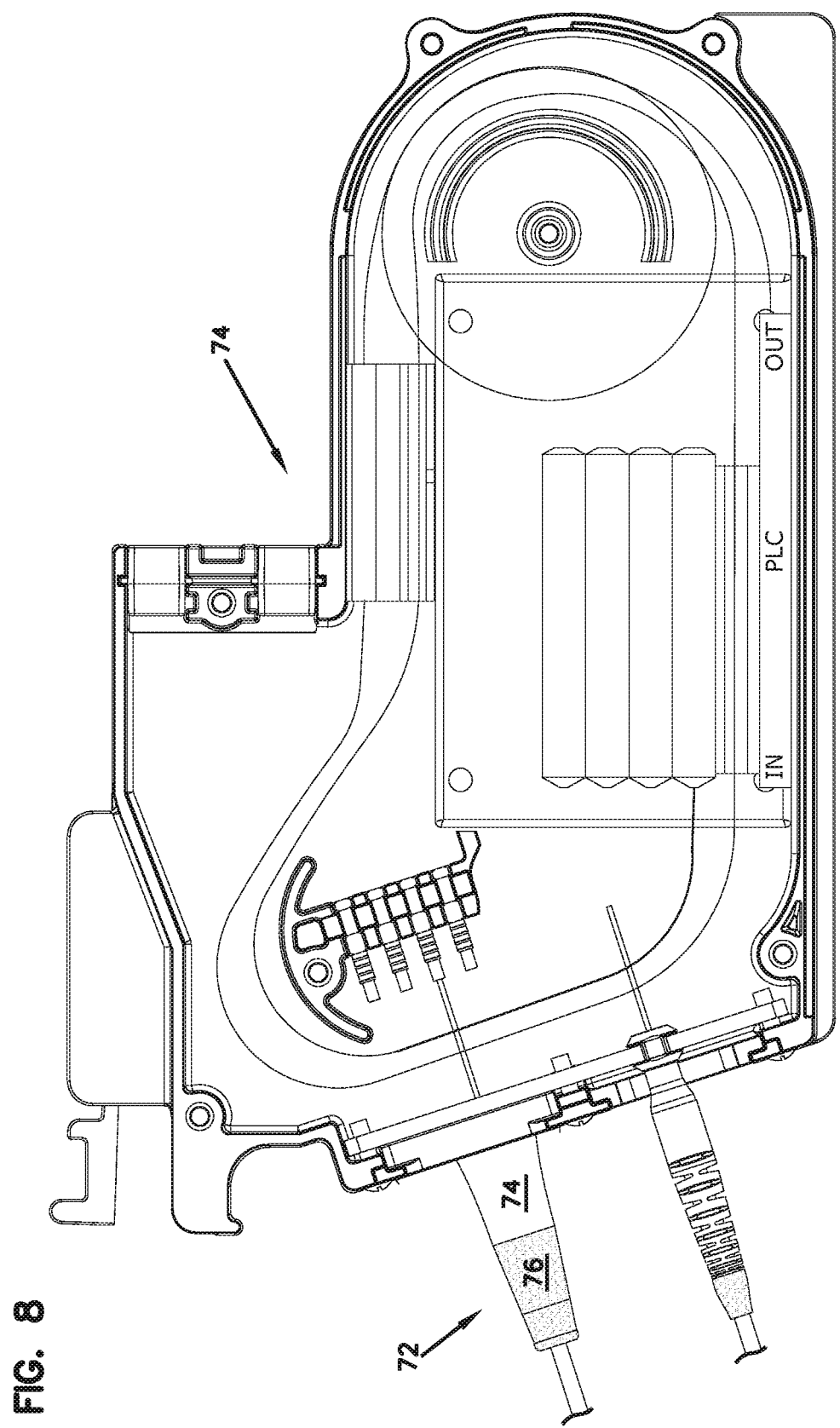
FIG. 8 is an isometric view of a telecommunication module according to the principles of the present disclosure.

In the depicted embodiment, the telecommunication housing that the first end 52 of the boot 50 is configured to be mounted to is the housing of a fiber optic connector. In the depicted embodiment, the fiber optic connector is an LC type connector. Referring to FIG. 8, the boot is shown mounted to a fiber optic module 70. It should be appreciated that the boot of the present disclosure can be mounted to any type of telecommunication housing. As discussed above, the boot of the present disclosure has applicability to any area where an optical fiber enters or exits a housing and is susceptible to being potentially bent beyond its minimum bend radius. The boot in the depicted embodiment is shown connected to a particular type of module 74 but it should be appreciated that the boot could alternatively be connected to any other type of module (e.g., splitter, furcation, etc.). The boot of the present disclosure has broad applicability in telecommunication fiber optic systems.

Referring to FIG. 8, an alternative embodiment of the boot 72 is shown. In the depicted embodiment, the boot 72 is configured to protect multiple cables flowing into a module. The module is constructed of a first material 74 and a second material 76. It should be appreciated that third and fourth materials and many more can also be incorporated into the boots. The multiple materials enable the boots of the present disclosure to have wider range of flexibility/stiffness than boots constructed of a single material. Flexibility in single material boots is modulated by geometry (radius, tappers, reliefs, axial gaps, etc.). However, geometry is only one of a number of ways the boots of the present disclosure utilize to modulate flexibility in the boot. The present disclosure allows for more compact, responsive and protective boot constructions.

It should be appreciated that although the difference in material is described in terms of difference in flexibility/stiffness, many other material differences are also possible. The ability to mix and match material to build a boot results in boots with improved features. In addition, it should be appreciated that the material having different properties can be arranged in any manner desired. For example, the softer material can be located at the distal end of the boot rather than the proximal end of the boot if such is desirable for a particular outcome. The boot could include a flex zone where both materials are present. Many configurations are possible.

The above specification, examples and data provide a complete description of the manufacture and use of the disclosure. Since many embodiments of the disclosure can be made without departing from the spirit and scope of the inventive aspects, the inventive aspects resides in the claims hereinafter appended.

What is claimed is:
1. A fiber optic connector including:
a connector housing, the connector housing including a first end and a second end, the connector housing including a connector housing axial passage that extends from the first end of the connector housing to the second end of the connector housing;
a ferrule, the ferrule having a first end and a second end, the second end of the ferrule secured to the first end of the connector housing, the ferrule including a ferrule axial passage that extends from the first end of the ferrule to the second end of the ferrule, wherein the ferrule axial passage is coaxially arranged with the connector housing axial passage;
a boot, the boot including a first end and a second end, the boot having a boot axial passage that extends from the first end of the boot to the second end of the boot, the boot axial passage is coaxially arranged with the connector housing axial passage; and
the boot including a boot first end portion adjacent the first end of the boot that is connected to the second end of the connector housing, a boot second end portion adjacent the second end of the boot, and a boot middle portion;
wherein the boot first end portion and the boot middle portion are constructed of a first material;
wherein the boot first end portion and the boot middle portion are of unitary construction having a length that is greater than that of the boot second end portion;
wherein the boot second end portion is constructed of a second material, the second material being different than the first material;
wherein the boot second end portion further comprises an overlap region wherein the boot second end portion is molded over a proximal end of the boot middle portion; and wherein the overlap region of the boot second end portion extends for a minority of the total length of the combined boot middle portion and the boot first end portion.

2. The fiber optic connector of claim 1, wherein the boot middle portion includes a plurality of co-axial rings separated by axial gaps, the rings being interconnected by links that extend across the axial gaps.

3. The fiber optic connector of claim 1, wherein the boot first end portion has a continuous smooth exterior surface profile.

4. The fiber optic connector of claim 1, wherein the second material molded at least partially fills an axial gap of the boot middle portion.

5. The fiber optic connector of claim 1, wherein the boot bends under as little as 0.2 lbs-force side load and resists bending beyond a predetermined bend radius under a side load of as great as 7.5 lbs-force.

6. The fiber optic connector of claim 1, wherein the boot second end portion includes a continuous smooth exterior surface profile.

7. The fiber optic connector of claim 1, wherein the second material is softer than the first material.

8. The fiber optic connector of claim 1, wherein the first material is a reinforced thermoplastic material.

9. The fiber optic connector of claim 1, wherein the second material is a thermoplastic vulcanizate material.

10. The fiber optic connector of claim 1, wherein the connector is an SC-type connector.

11. The fiber optic connector of claim 1, wherein the boot first end portion is adapted to engage the connector housing by a snap-fit, press-fit, interlock, or threaded connection to secure the boot to the housing.

12. A boot for a telecommunication housing comprising:
a first end and a second end, the boot having a boot axial passage that extends from the first end of the boot to the second end of the boot; and
a boot first end portion adjacent the first end of the boot configured to mount to a telecommunication housing, a boot second end portion adjacent the second end of the boot, and a boot middle portion;
wherein the boot first end portion and the boot middle portion are i-s-constructed of a first material;
wherein the boot first end portion and the boot middle portion are of unitary construction having a length that is greater than that of the boot second end portion;
wherein the boot second end portion is constructed of a second material, the second material being different than the first material;
wherein the boot second end portion further comprises an overlap region wherein the boot second end portion is molded over a proximal end of the boot middle portion; and
wherein the overlap region of the boot second end portion extends for a minority of the total length of the combined boot middle portion and the boot first end portion.

13. The boot of claim 12, wherein the boot middle portion includes a plurality of co-axial rings separated by axial gaps, the rings being interconnected by links that extend across the axial gaps.

14. The boot of claim 12, wherein the second material molded at least partially fills an axial gap of the boot middle portion.

15. The boot of claim 12, wherein the boot bends under as little as 0.2 lbs-force side load and resists bending beyond a predetermined bend radius under a side load of as great as 7.5 lbs-force.

16. The boot of claim 12, wherein the telecommunication housing is a housing of a fiber optic connector.

17. The boot of claim 12, wherein the telecommunication housing is a housing of a fiber optic module.

18. The boot of claim 12, wherein the boot first end portion is adapted to receive and retain a fiber optic connector housing.

19. The fiber optic connector of claim 1, wherein the boot first end portion and the boot middle portion have a combined length of between about 19 mm to about 37 mm.

20. The fiber optic connector of claim 1, wherein the overlap region of the boot second end portion extends for a length of between about 1 mm to about 4 mm.

21. The boot of claim 12, wherein the boot first end portion and the boot middle portion have a combined length of between about 19 mm to about 37 mm.

22. The boot of claim 12, wherein the overlap region of the boot second end portion extends for a length of between about 1 mm to about 4 mm.

23. A fiber optic connector including:
a connector housing, the connector housing including a first end and a second end, the connector housing including a connector housing axial passage that extends from the first end of the connector housing to the second end of the connector housing;
a ferrule for supporting an optical fiber at the first end of the connector housing;
a boot, the boot including a first end and a second end, the first end of the boot connecting to the second end of the connector housing, the boot having a boot axial passage that extends from the first end of the boot to the second end of the boot, the boot axial passage being coaxially arranged with the connector housing axial passage; and
the boot including a first molded body having a first end defining the first end of the boot and an opposite second end, the first molded body having a length that extends from the first end of first molded body to the second end of the first molded body, the first molded body being constructed of a first material; and
the boot including a second molded body having a first end over-molded over the second end of the first molded body and a second end defining the second end of the boot, the second molded body being constructed of a second material that is softer than the first material, the second molded body overlapping the first molded body along an overlap length that extends along a minority of the length of the first molded body.

24. The fiber optic connector of claim 23, wherein the first molded body includes a plurality of co-axial rings separated by axial gaps with the rings being interconnected by links that extend across the axial gaps, wherein at least a majority of the axial gaps are not covered by the second molded body.

* * * * *